(12) United States Patent
Zhang

(10) Patent No.: US 9,021,714 B2
(45) Date of Patent: May 5, 2015

(54) CONCENTRICITY TEST DEVICE

(71) Applicant: Zhongshan Innocloud Intellectual Property Services Co., Ltd., Zhongshan (CN)

(72) Inventor: Bing-Jun Zhang, Shenzhen (CN)

(73) Assignee: Zhongshan Innocloud Intellectual Property Services Co., Ltd., Zhongshan (CN)

( * ) Notice: Subject to any disclaimer, the term of this patent is extended or adjusted under 35 U.S.C. 154(b) by 114 days.

(21) Appl. No.: 13/901,580

(22) Filed: May 24, 2013

(65) Prior Publication Data

US 2014/0259717 A1    Sep. 18, 2014

(30) Foreign Application Priority Data

Mar. 13, 2013   (CN) .......................... 2013 1 0079568

(51) Int. Cl.
  *G01B 5/14*    (2006.01)
  *G01B 5/252*   (2006.01)
(52) U.S. Cl.
  CPC ................ *G01B 5/143* (2013.01); *G01B 5/252* (2013.01)
(58) Field of Classification Search
  USPC .................................................. 33/543, 550
  See application file for complete search history.

(56) References Cited

U.S. PATENT DOCUMENTS

| | | | | |
|---|---|---|---|---|
| 2,547,774 A * | 4/1951 | Prais ............................ | 33/199 R |
| 2,601,447 A * | 6/1952 | Neff ................................ | 33/517 |
| 2,739,389 A * | 3/1956 | Carter ............................. | 33/543 |
| 2,765,539 A * | 10/1956 | Scar ................................. | 33/611 |
| 3,254,415 A * | 6/1966 | Eisele ............................. | 33/543 |
| 3,254,416 A * | 6/1966 | Eisele ............................. | 33/548 |
| 3,367,033 A * | 2/1968 | Eisele ............................. | 33/543 |
| 3,823,484 A * | 7/1974 | Dunn .............................. | 33/560 |
| 4,383,368 A * | 5/1983 | Morawski et al. .............. | 33/529 |
| 4,439,925 A * | 4/1984 | Lock .............................. | 33/645 |
| 4,679,330 A * | 7/1987 | Williams ........................ | 33/550 |
| 4,803,783 A * | 2/1989 | Tiegs et al. ..................... | 33/557 |
| 5,044,088 A * | 9/1991 | Peucker ......................... | 33/550 |
| 5,182,865 A * | 2/1993 | Greenslade .................... | 33/550 |
| 2007/0180721 A1* | 8/2007 | Furukawa ....................... | 33/543 |
| 2012/0266474 A1* | 10/2012 | Zhang ............................ | 33/550 |
| 2013/0219731 A1* | 8/2013 | Zhang ............................ | 33/550 |
| 2014/0259717 A1* | 9/2014 | Zhang ............................ | 33/543 |

\* cited by examiner

*Primary Examiner* — Yaritza Guadalupe-McCall
(74) *Attorney, Agent, or Firm* — Novak Druce Connolly Bove + Quigg LLP

(57) ABSTRACT

A test device for testing concentricity between first and second holes in parallel plates includes a positioning pole and a test pole. The positioning pole includes a head segment having a tapered positioning portion. The positioning pole axially defines a through hole. The test pole is telescopically received in the through hole of the positioning pole. The test pole includes a test head with a diameter slightly less than a diameter of the second hole. The positioning portion of the positioning pole extends into the first hole with the conic section of the positioning portion abutting against an inner wall bounding the first hole. The test head of the test pole faces the second plate and approaches and confirms the concentricity of the hole in the second plate by sliding the test pole relative to the positioning pole.

7 Claims, 4 Drawing Sheets

CONCENTRICITY TEST DEVICE

BACKGROUND

1. Technical Field

The present disclosure relates to a concentricity test device.

2. Description of Related Art

A three-dimensional measurement device can be employed for testing concentricity of two holes respectively defined in two parallel plates. However, using a three-dimensional measurement device is time-consuming, which cannot satisfy the demands of mass-production.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one."

Figure 1:
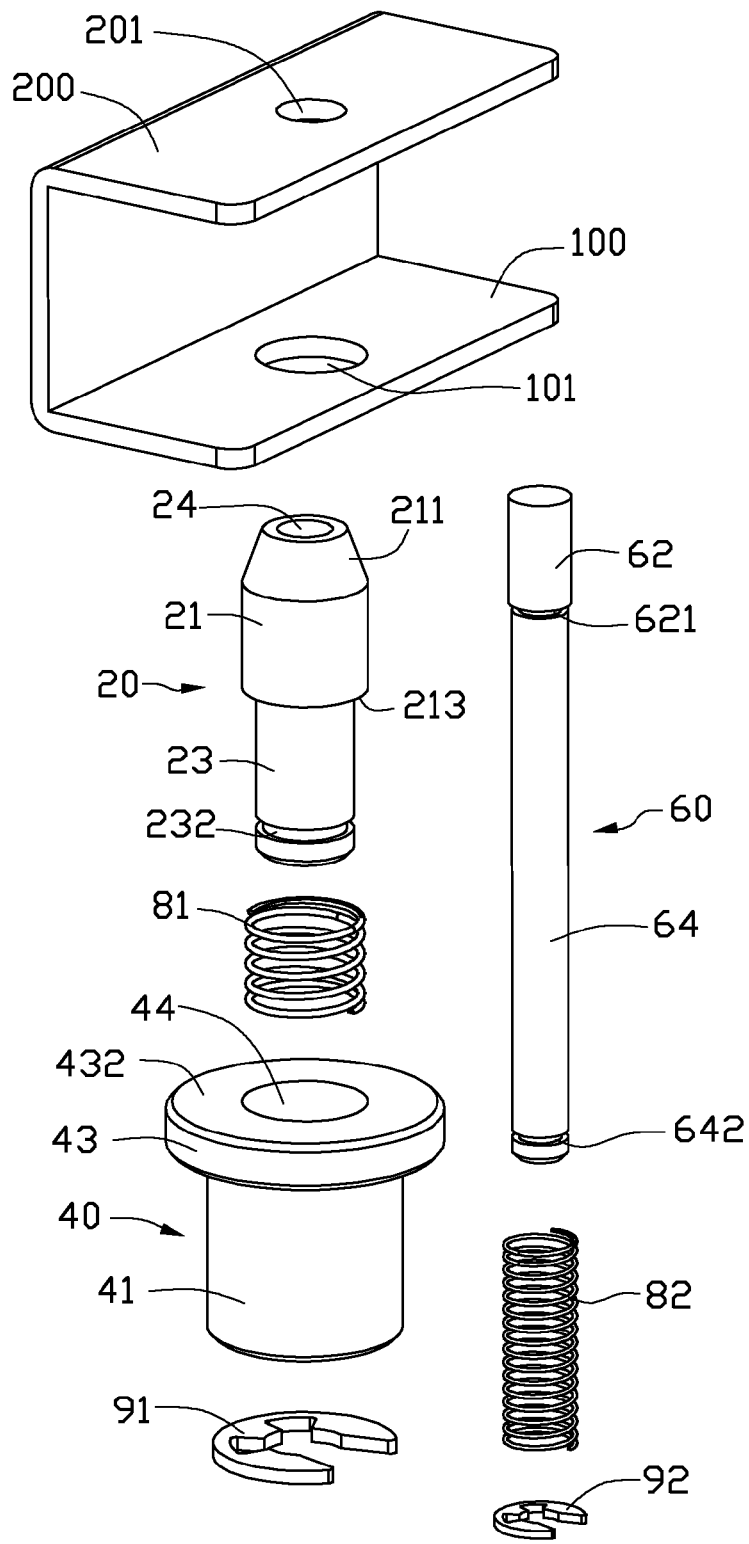
FIG. 1 is an exploded view of an embodiment of a concentricity test device together with an object to be tested.

FIG. 1 shows an exemplary embodiment of a concentricity test device for testing whether a first hole 101 and a second hole 201 are concentric or not. In one embodiment, the first hole 101 and the second hole 201 are respectively defined in a first plate 100 and a second plate 200 parallel to the first plate 100. A diameter of the first hole 101 is greater than a diameter of the second hole 201. The concentricity test device includes a positioning pole 20, a sleeve 40, a test pole 60, a first resilient member 81, a second resilient member 82, a first clip 91, and a second clip 92.

The positioning pole 20 includes a head segment 21 and an extension segment 23 axially extending from a bottom end of the head segment 21. A tapered positioning portion 211 is formed at a top end of the head segment 21. A basic untapered diameter of the head segment 21 is greater than a diameter of the extension segment 23. A shoulder 213 is formed at a junction of the head segment 21 and the extension segment 23. An annular mounting groove 232 is defined in the extension segment 23, adjacent to a bottom end of the extension segment 23. A through hole 24 is axially defined in the positioning pole 20. A diameter of a small end of the positioning portion 211 is less than the diameter of the first hole 101, and a diameter of a large end of the positioning portion 211 is greater than the diameter of the first hole 101.

The sleeve 40 axially defines a through hole 44 and includes an annular rim 43 arranged at a top end of the sleeve 40. The annular rim 43 forms a base surface 432 facing upward and perpendicular to an axial direction of the sleeve 40. An annular stopping portion 411 protrudes from an inner wall of the sleeve 40, adjacent to a bottom end of the sleeve 40.

The test pole 60 includes a test head 62 and a shaft 64 axially extending from a bottom end of the test head 62. A diameter of the test head 62 is greater than a diameter of the shaft 64 and the diameter of the through hole 24. A shoulder 621 is formed at a junction of the test head 62 and a shaft 64. An annular mounting groove 642 is defined in the shaft 64, adjacent to a bottom end of the shaft 64. A diameter of the shaft 64 is less than a diameter of the through hole 24 of the positioning pole 20 and slightly less than the diameter of the second hole 201.

In one embodiment, the first resilient member 81 is a coil spring having a diameter greater than the diameter of the extension segment 23 of the positioning pole 20 but less than a diameter of the through hole 44 of the sleeve 40. The second resilient member 82 is a coil spring having a diameter greater than the diameter of the shaft 64 of the test pole 60 but less than the diameter of the extension segment 23 of the positioning pole 20.

Figure 2:
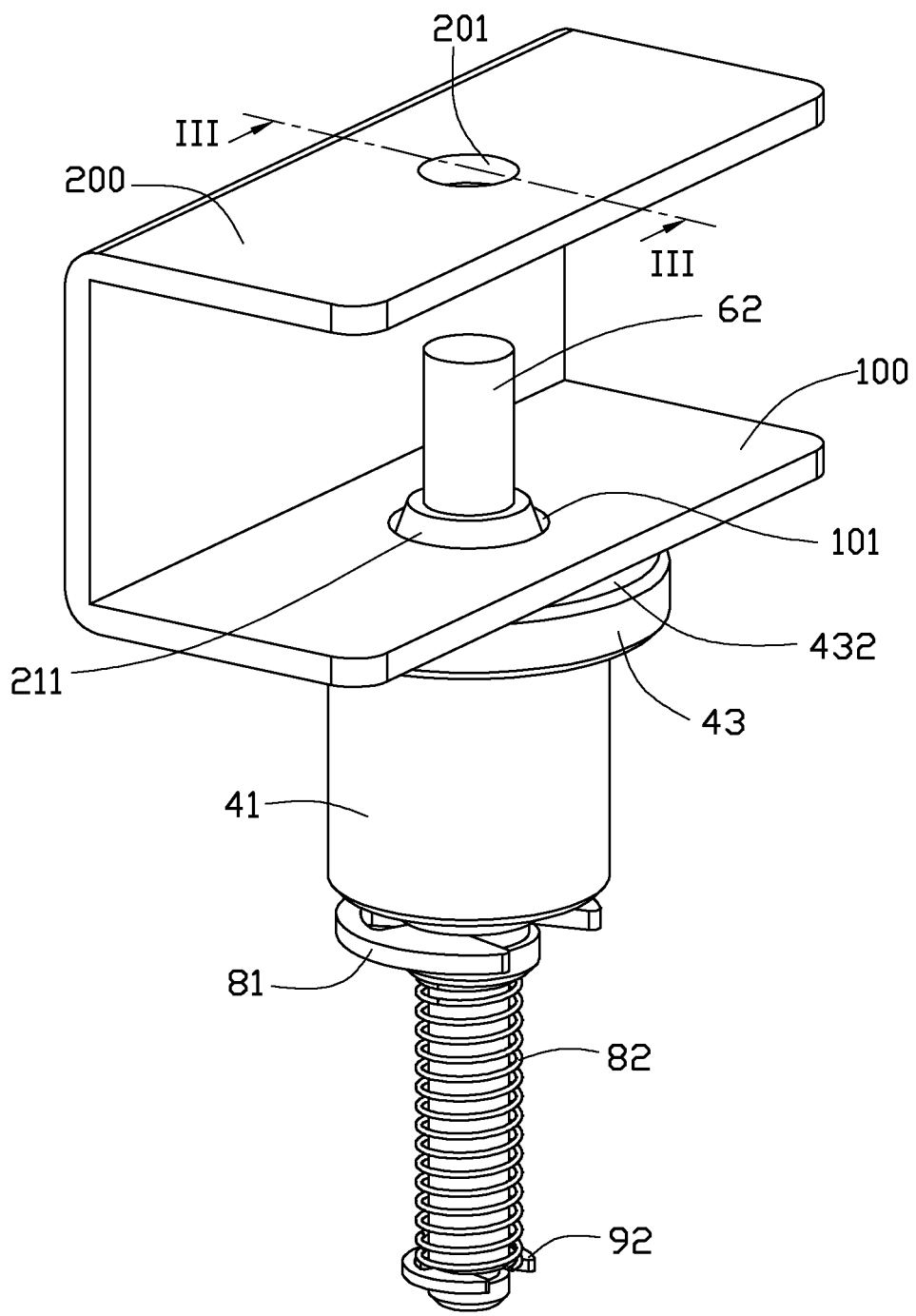
FIG. 2 is an assembled view of the concentricity test device and the object of FIG. 1.
Figure 3:
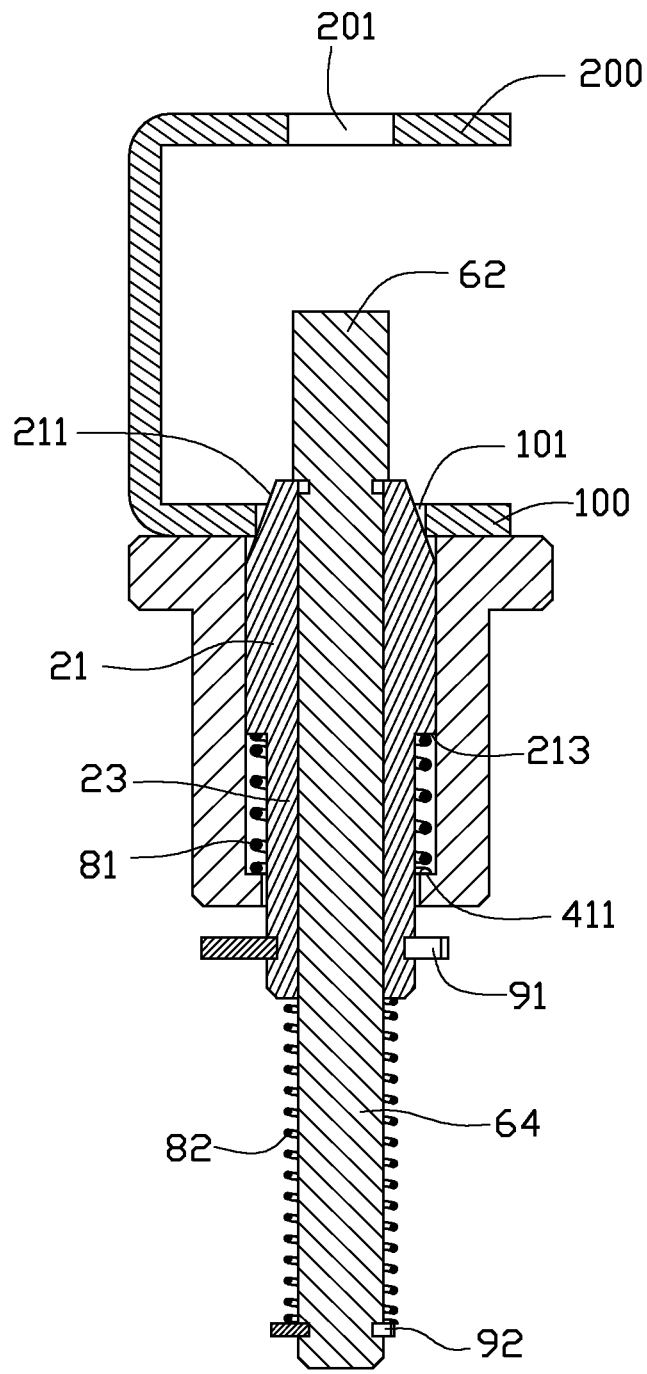
FIG. 3 is cross-sectional view taken along the line III-III of FIG. 2.

Referring to FIGS. 2 and 3, in assembly, the first resilient member 81 is placed around the extension segment 23 of the positioning pole 20, and received in the through hole 44 of the sleeve 40. Opposite ends of the first resilient member 81 respectively abut against the shoulder 213 of the positioning pole 20 and the stopping portion 411 of the sleeve 40. The bottom end of the extension segment 23 extends out of the through hole 44 of the sleeve 40 to expose the mounting groove 232 beyond the bottom end of the sleeve 40. The first clip 91 is retained in the mounting groove 232 to prevent the positioning pole 20 from disengaging from the sleeve 40.

The shaft 64 of the test pole 60 slidably extends through the through hole 24 of the positioning pole 20 from the top end of the positioning pole 20, until the shoulder 621 of the test pole 60 abuts against the positioning pole 20. The second resilient member 82 is placed around the shaft 64 outside the positioning pole 20. The second clip 92 is retained in the mounting groove 642 of the shaft 64 to make opposite ends of the resilient member 82 respectively abut against the bottom end of the extension segment 23 of the positioning pole 20 and the second clip 92. In this way, the test pole 60 is telescopically received in the positioning pole 20.

Figure 4:
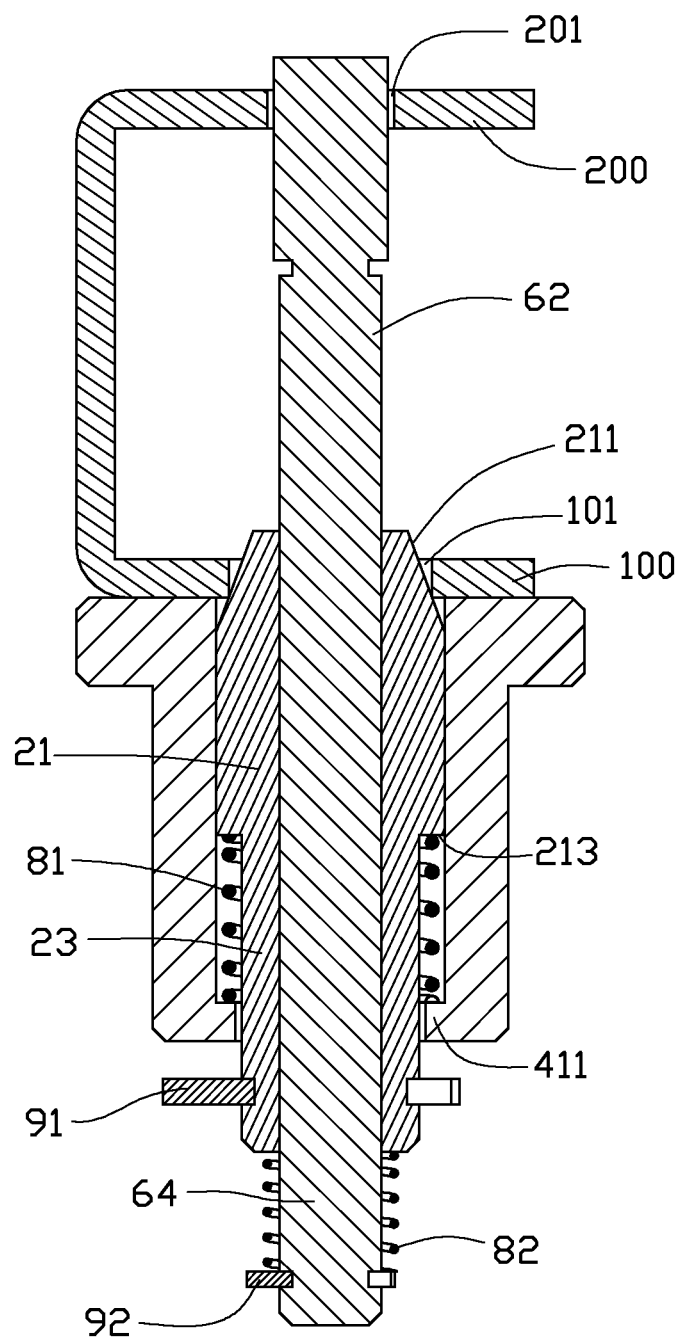
FIG. 4 is similar to FIG. 3, but showing another state of use of the concentricity test device.

Referring to FIG. 4, in use, the sleeve 40 is manipulated to align the positioning portion 211 of the positioning pole 20 and the test head 62 of the test pole 60 with the first hole 101 and make the base surface 432 of the first plate 100 abut against the bottom surface of the first plate 100 opposite to the second plate 200. The positioning portion 211 of the positioning pole 20 engages in the first hole 101 and the test head 62 of the test pole 60 extends through the first hole 101. The first resilient member 91 biases the positioning pole 20 upward to force a conic side of the positioning portion 211 into tight contact with an inner wall bounding the first hole 101, thereby attempting to make a concentricity between the through hole 24 of the positioning pole 20 and the test pole 60 through the first hole 101. The bottom end of the shaft 64 is pushed up, to make the test head 62 approach the second plate 200. If the test head 62 extends through the second hole 201, the first hole 101 and the second hole 201 are in fact concentric. If the test head 62 is stopped by the second plate 200, the first hole 101 and the second hole 201 are not concentric.

Even though numerous characteristics and advantages of the embodiments have been set forth in the foregoing description, together with details of the structure and the functions of the embodiments, the disclosure is illustrative only, and changes may be made in details, especially in the matters of shape, size, and arrangement of parts within the principles of the embodiments to the full extent indicated by the broad general meaning of the terms in which the appended claims are expressed.

What is claimed is:

1. A concentricity test device to test whether a concentricity of a first hole defined in a first plate and a second hole defined in a second plate parallel to the first plate is eligible or not, the concentricity test device comprising:

a positioning pole comprising a head segment and an extension segment axially extending down from a bottom end of the head segment, the positioning pole axially defining a through hole extending through the head segment and the extension segment, the head segment comprising a tapered positioning portion arranged at a top end of the head segment, a diameter of a small end of the positioning portion being less than a diameter of the first hole, and a diameter of a large end of the positioning portion being greater than the diameter of the first hole, and a conic section between the small end and the large end being formed on the positioning portion; and a test pole telescopically received in the through hole of the positioning pole and comprising a test head arranged at a top end of the test pole, the test head having a diameter slightly less than a diameter of the second hole of the second plate, wherein the positioning portion of the positioning pole is operable of extending into the first hole from a side of the first plate opposite to the second plate, with the conic section of the positioning portion contacting with an inner wall bounding the first hole; the test head of the test pole is operable of moving toward the second hole of the second plate; if the test head can extend through the second hole, the concentricity of the first hole and the second hole is eligible; if the test head is stopped by the second plate, the concentricity of the first hole and the second hole is ineligible.

2. The concentricity test device of claim 1, further comprising a sleeve axially defining a through hole, and a first resilient member received in the through hole of the sleeve, wherein the sleeve comprises a base surface facing upward at a top end of the sleeve and perpendicular to an axial direction of the sleeve, wherein the base surface of the sleeve is operable of abutting against the side of the first plate opposite to the second plate, the positioning pole extends through the through hole of the sleeve, the first resilient member biases the positioning pole upward.

3. The concentricity test device of claim 2, wherein the sleeve comprises a stopping portion protruding on an inner wall of the sleeve adjacent to a bottom end of the sleeve; the positioning pole further comprises a shoulder formed at a junction of the head segment and the extension segment which has a diameter less than a diameter of the head segment; the first resilient member is placed around the extension segment of the positioning pole, opposite ends of the first resilient member respectively abut against the shoulder of the positioning pole and the stopping portion of the sleeve.

4. The concentricity test device of claim 2, further comprising a clip, wherein the extension segment of the positioning pole defines a mounting groove adjacent to a bottom end of the extension segment, the clip is retained in the mounting groove.

5. The concentricity test device of claim 2, wherein the sleeve further comprises an annular rim arranged at a top end of the sleeve, the base surface is formed on the annular rim.

6. The concentricity test device of claim 2, wherein the test pole further comprises a shaft axially extending from a bottom end of the test head, a diameter of the test head is greater than a diameter of the through hole of the positioning pole, a diameter of the shaft is less than the diameter of the through hole of the positioning pole, the shaft is slidably received in the through hole of the positioning pole.

7. The concentricity test device of claim 6, further comprising a second resilient member and a clip, wherein the shaft defines a mounting groove adjacent to a bottom end of the shaft, the clip is retained in the mounting groove of the shaft, the second resilient member is placed around the shaft and arranged between the clip and a bottom end of the extension segment of the positioning pole.

* * * * *